United States Patent
Wells et al.

(10) Patent No.: US 7,811,367 B2
(45) Date of Patent: Oct. 12, 2010

(54) DRYING ENHANCEMENT ADDITIVE AND METHOD OF USING SAME

(75) Inventors: Gregory Wells, Edmond, WV (US); Shane Landis, Snohomish, WA (US)

(73) Assignee: Genesis II of NC, LLC, Burlington, NC (US)

( * ) Notice: Subject to any disclaimer, the term of this patent is extended or adjusted under 35 U.S.C. 154(b) by 0 days.

(21) Appl. No.: 12/702,098

(22) Filed: Feb. 8, 2010

(65) Prior Publication Data

US 2010/0147189 A1   Jun. 17, 2010

Related U.S. Application Data

(62) Division of application No. 11/307,273, filed on Jan. 30, 2006, now Pat. No. 7,682,440.

(60) Provisional application No. 60/666,147, filed on Mar. 29, 2005.

(51) Int. Cl.
   C09D 11/02   (2006.01)
(52) U.S. Cl. .................................. 106/31.13; 106/310

(58) Field of Classification Search ................. 106/310, 106/31.13
See application file for complete search history.

(56) References Cited

U.S. PATENT DOCUMENTS 5,141,562 A * 8/1992 Cells ........................... 106/310
6,626,985 B1 * 9/2003 Johnson, Jr. ............. 106/31.34

OTHER PUBLICATIONS

Bryan A. Isley, Declaration Sep. 8, 2008.*

\* cited by examiner

*Primary Examiner*—J. A. Lorengo
*Assistant Examiner*—Veronica Faison Gee
(74) *Attorney, Agent, or Firm*—Ashley Law Firm PC; Stephen S. Ashley, Jr.

(57) ABSTRACT

A drying agent particularly suited for facilitating the drying of inks and paints includes a cobalt drier that is more than six percent cobalt by weight, and no more than fourteen percent cobalt by weight. In particular, the cobalt drier is twelve percent cobalt by weight. The drying agent can also include a manganese drier, tung oil, a water-activated drier, a two-way drier, and a lithographic overprint varnish. All ingredients can be present in the mixture at a concentration of one part by weight. The drying agent can be used with a variety of printing stock substrates, and may be used at significantly higher concentrations than prior art drying agents.

14 Claims, 6 Drawing Sheets

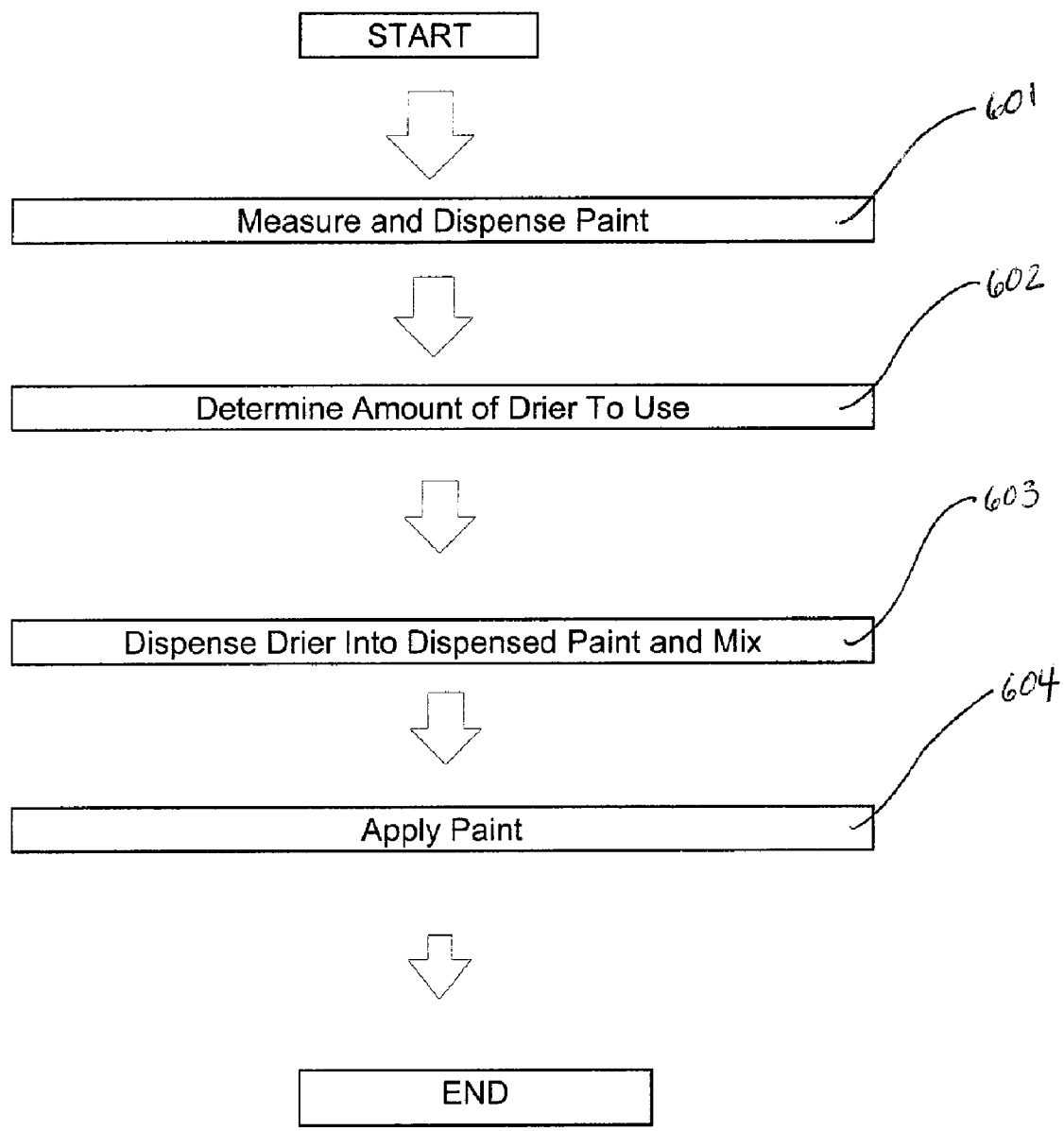

DRYING ENHANCEMENT ADDITIVE AND METHOD OF USING SAME

This application is a divisional of application Ser. No. 11/307,273, filed Jan. 30, 2006, which claims priority to U.S. Provisional Application No. 60/666,147, filed Mar. 29, 2005. The present invention is directed to a drying enhancement additive, particularly for accelerating the drying and curing of inks and paints.

TECHNICAL FIELD AND BACKGROUND OF THE INVENTION

In process manufacturing, printing and allied arts, construction, shipbuilding, and many other facets of modern industry, there exists processes that require the drying or curing of liquid substances, such as inks, dyes and paints. In many of these applications there is an economic incentive to reduce the amount of time associated with such curing or drying stages, because such a reduction results in increased productivity.

Attempts have been made to reduce drying or curing time of liquid substances. Many attempts have been aimed at increasing the intrinsic volatility of the dryable liquids, often resulting in the evolution of noxious vapor, decreased flashpoint, increased chance of explosion and other undesirable properties of the hardened material.

In other instances, alternative chemistries to initiate curing have been developed including electron beam curing, ultraviolet curing, and two-photon curing. While many successful examples of such instances exist, there remain a large number of applications for which such processes are impractical. In other instances, focus has been placed on two-part chemistries. While two-part systems affect excellent curing properties in many systems and environments, they are impractical in other instances.

In many instances, focus has been paid to improving the curing apparatus itself. Many advances in printing press design, for example, have focused on increasing airflow and hence efficiency within drying tunnels, introduction of efficient ultraviolet (UV) emitters for UV-initiated inks, and the development of enhanced infrared (IR) drying mechanisms. While these approaches have often resulted in significantly improved printing press performance, they add cost and do not always result in sufficiently decreased cure time to fully meet all the needs of the printer.

Even with existing material and apparatus systems that nominally meet the needs of users, there are circumstances in which conditions are not conducive to drying and curing. In many cases, these adverse conditions relate to unusual environmental conditions that are too warm, too cool, too humid, or too dry. In other cases, variations in contacting surface properties such as changes in pH, porosity, or smoothness, for example, interfere with curing mechanisms. Altering these adverse surface properties to properties that are more conducive to curing is often not practical or desirable.

Within the field of printing, in particular, it is especially important to control curing or drying rates in order to maximize press speed and reduce waiting times between printing and post-processing steps. Many different technologies are used today for printing the goods, documents, and forms encountered daily. While much effort has been made in recent years to develop technologies that do not involve drying, such as electro-photography and thermal transfer, traditional wet ink technologies remain important.

Offset lithography is used for printing many of the documents and forms used on a daily basis. It is especially useful for short run documents such as business cards, flyers, pamphlets, etc.

Offset lithographic printing presses operate on the principal of immiscibility of polar and non-polar fluids. Printing plates used for offset lithographic printing are prepared with areas corresponding to printed areas having a hydrophobic property and areas corresponding to non-printed areas being hydrophilic. The printing plate is mounted on a cylinder, and the cylinder is rotated past a water delivery mechanism that coats the plate with water. Water stays on those areas that are hydrophilic and is repelled from the hydrophobic areas. The plate is then rotated further to an ink delivery mechanism that applies a thin layer of ink. The ink used by offset lithographic presses is oil-based and hydrophobic. Accordingly, the ink sticks to the hydrophobic areas of the plate where there is no water and does not stick to the hydrophilic areas coated with water.

After the plate is coated with ink adhering selectively, it is further rotated to a nip with the main cylinder. Paper is transported through the nip between the blanket cylinder and the impression cylinder in proper registration with the ink image on the blanket cylinder. Ink from the blanket cylinder is transferred to the paper at the main cylinder nip. After having ink thus adhered to its surface, the paper is then transported through a region where the ink cures, often on a chain that grips the edges of the paper. After, a curing device facilitates curing of the ink to make it dry enough to stack without transferring to the back of the overlying sheet, such transfers being known as offsetting. There are several different forms of curing devices including forced air drying tunnels, infrared (IR) emitters, electron beam emitters, and ultraviolet (UV) emitters.

Many offset lithographic printing presses are sheet fed as discussed above. In sheet-fed presses and duplicators, individual sheets are carried from the feeder, through one or more printing stations, through a drying or curing apparatus, and stacked in an output bin. Other offset lithographic presses and duplicators are web fed, the printing media being supplied in continuous web and carried in such a form throughout the printing press. Output from web-fed presses and duplicators may either be wound into a roll for further processing or may be cut, scored, folded, and/or stacked.

Referring now to the lithographic ink delivery mechanism, ink is delivered to the plate cylinder though an ink train. The ink train is comprised of a fountain containing bulk ink and a series of rollers that apply shear force, spread the ink, and physically move the resultant ink film to a nip where it is transferred to the plate cylinder. Shear force is used to level the ink, meter the ink, and reduce its viscosity sufficiently for further processing, including transfer to the plate cylinder, transfer to the blanket cylinder, transfer to the paper, and leveling on the paper.

Offset lithographic inks are generally high viscosity pastes that are shear thinned in the ink train. Conventional offset lithographic inks are heat-cured. Heat curing involves a complex sequence of events that includes boiling off volatile hydrocarbons, penetration of liquated phase materials into porous printing substrates, and cross-linking and oxidation of resin ink components. A more complete explanation of ink curing is presented in the book entitled What the Printer Should Know About Ink, by Terry Scarlett and Nelson R Eldred, published by the Graphics Arts Technical Foundation, hereby incorporated by reference. Curing often proceeds from the surface downward. Conventional heat-cured inks may be aided in curing by exposure to an IR emitter.

A common concern with the offset lithographic printing process and more specifically with the inks used in the process is the rate of cure of the ink. In many cases, ink in its pure form will not cure fast enough to meet process constraints. Often slip-sheets must be placed between stacked printed documents to prevent offsetting. Often printed sheets must be allowed to sit for a period of several hours or even days prior to further processing in order to prevent smudging of the printed image.

Many environmental and material variables affect the rate of cure including humidity, temperature, printing stock porosity and type, printing stock total alkalinity, and printing stock pH. Certain printing media, including felt-weave paper stock and non-porous plastics for example, have historically proven to be unsuitable for use in offset lithography because of poor drying. Some inks, for example those that contain green and blue pigments, are inherently slow drying. Other ink colors that frequently have relatively long drying times include violet, purple, opaque white, rhodamine, and process blue.

Drying agents have been added to inks in the ink fountain in order to speed curing. Drying agents are typically specialized so as to match particular printing stock and ink characteristics. Typical drying agents are hydrophobic, oil-based liquid that are added at a rate of fractional weight percentages, such as one-quarter to one-half ounce per pound of ink. In the prior art, drying agent concentration is kept low so as to avoid causing the ink to cure in the fountain or on the ink delivery train. Another disadvantage of the prior art ink driers is their tendency to reduce press runability, often causing stripping or splitting, the non-adherence of ink-to-ink train rollers, and other negative effects. Even after the addition of a drying agent to its recommended concentration, offset lithographic ink often does not dry fast enough to avoid the laborious process of adding slip sheets or the inconvenience of ageing the printed documents prior to further processing. Another common concern with lithographic printing is emulsification, or the formation of water phase around pigment particles during ink transfer from the ink train to the plate, then to the transfer cylinder, and on to the printing substrate. Emulsification results in print quality degradation and loss of tonal intensity.

Other widely used wet-ink printing technologies that have experienced issues with ink dry time include flexography, letterpress printing, and screen-printing. The use of UV-cured and electron beam-cured inks has been one approach that has resulted in harder drying and faster press running, but these types of inks are generally more expensive than more traditional heat-cured inks.

Flexographic and letterpress printing in particular have frequently been used to preprint label stock for use in heat-generating printings such as electrophotographic and thermal printers. Pre-printed media used in these applications has been especially sensitive to incomplete cure and is exhibited as ink transfer to internal printer components such as fuser rollers (in the case of electrophotographic printers) or printheads (in the case of thermal printers). Such unwanted ink transfer may frequently result in catastrophic failure of the affected components.

Another process that has frequently encountered drying or curing rates as an obstacle is painting. Often, paint drying rates are enhanced by heating the painted object and region. For some applications this is impractical owing to the size of the object or the environment. In other applications, such heating still results in drying times that are longer than desired. There are many industrial and domestic settings in which faster drying of paint is desirable.

SUMMARY OF THE INVENTION

Therefore, it is an object of the invention to provide an improved drying agent or drying enhancer.

Another object of the invention is to provide a drying enhancer for lithographic ink that offers faster cure rates than prior art drying agents.

Yet another object of the invention is to provide a drying agent that can be used with a variety of printing stock substrates, and which may be used at significantly higher concentrations than prior art drying agents.

Yet another object of the invention is to provide a drying enhancer that may be used with a variety of inks.

Yet another object of the present invention is to the method of using a drying enhancer to improve the drying of inks on a printing press or duplicator.

Yet another object of the present invention is to provide an ink that has improved drying characteristics.

Yet another object of the present invention is to provide a paint having improved drying characteristics. Yet another object of the present invention is to provide an ink drying composition that can be added to the ink in a one to one ratio.

These and other objects of the invention are achieved by providing a drying agent having a cobalt drier, in which the cobalt drier includes more than six percent cobalt by weight and less than fourteen percent cobalt by weight.

According to a preferred embodiment of the invention, the cobalt drier includes about twelve percent cobalt by weight.

According to another preferred embodiment of the invention, the cobalt drier comprises one or more cobalt chelates.

According to yet another preferred embodiment of the invention, the drying agent includes a manganese drier.

According to yet another preferred embodiment of the invention, the manganese drier includes a paste having at least one manganese chelate in a hydrocarbon-based solvent.

According to yet another preferred embodiment of the invention, the drying agent includes tung oil.

According to yet another preferred embodiment of the invention, a water-activated drier.

According to yet another preferred embodiment of the invention, the water-activated drier includes petroleum at a concentration of no more than eleven percent by weight.

According to yet another preferred embodiment of the invention, the drying agent includes a two-way drier.

According to yet another preferred embodiment of the invention, the two-way drier includes cobalt tallate, manganese tallate and cobalt acetate.

According to yet another preferred embodiment of the invention, the drying agent includes a lithographic overprint varnish.

According to yet another preferred embodiment of the invention, the lithographic overprint varnish includes petroleum at a concentration of no more than twenty-two percent by weight.

According to yet another preferred embodiment of the invention, a drying agent includes a cobalt drier, the cobalt drier comprising about twelve percent cobalt by weight, a manganese drier, tung oil, a water-activated drier, a two-way drier, and a lithographic overprint varnish.

According to yet another preferred embodiment of the invention, the drying agent includes one part by weight of the cobalt drier, one part by weight of the manganese drier, one part by weight of the tung oil, one part by weight of water-activated drier, one part by weight of the two-way drier, and one part by weight of the lithographic overprint varnish.

According to yet another preferred embodiment of the invention, a method for making a drying agent includes the steps of providing a manganese drier in a container, adding a lithographic overprint varnish to the container, adding a cobalt drier comprising about twelve percent cobalt by weight to the container, adding a two-way drier to the container, and adding a water-activated drier to the container.

According to yet another preferred embodiment of the invention, the method for making a drying agent includes agitating the manganese drier, the lithographic overprint varnish, the cobalt drier, the two-way drier and the water-activated drier in the container until forming a uniformly distributed mixture in the container, and adding tung oil to the container.

According to yet another preferred embodiment of the invention, an ink mixture having enhanced drying characteristics includes an ink, and a drying agent including a cobalt drier, a manganese drier, tung oil, a water-activated drier, a two-way drier, and a lithographic overprint varnish. The drying agent is three to fifty percent by weight of the mixture.

According to yet another preferred embodiment of the invention, the drying agent is ten to fifteen percent by weight of the ink/drier mixture.

According to yet another preferred embodiment of the invention, a paint mixture having enhanced drying characteristics includes a paint, and a drying agent having a cobalt drier that is about twelve percent cobalt by weight, a manganese drier, tung oil, a water-activated drier, a two-way drier, and a lithographic overprint varnish.

According to yet another preferred embodiment of the invention, the drying agent is about fifteen percent by weight of the paint/drier mixture.

BRIEF DESCRIPTION OF THE DRAWINGS

FIG. 6 is a flow chart illustrating another method of using an ink drying agent according to a preferred embodiment of the invention.

DETAILED DESCRIPTION OF THE PREFERRED EMBODIMENTS OF THE INVENTION

Figure 1:
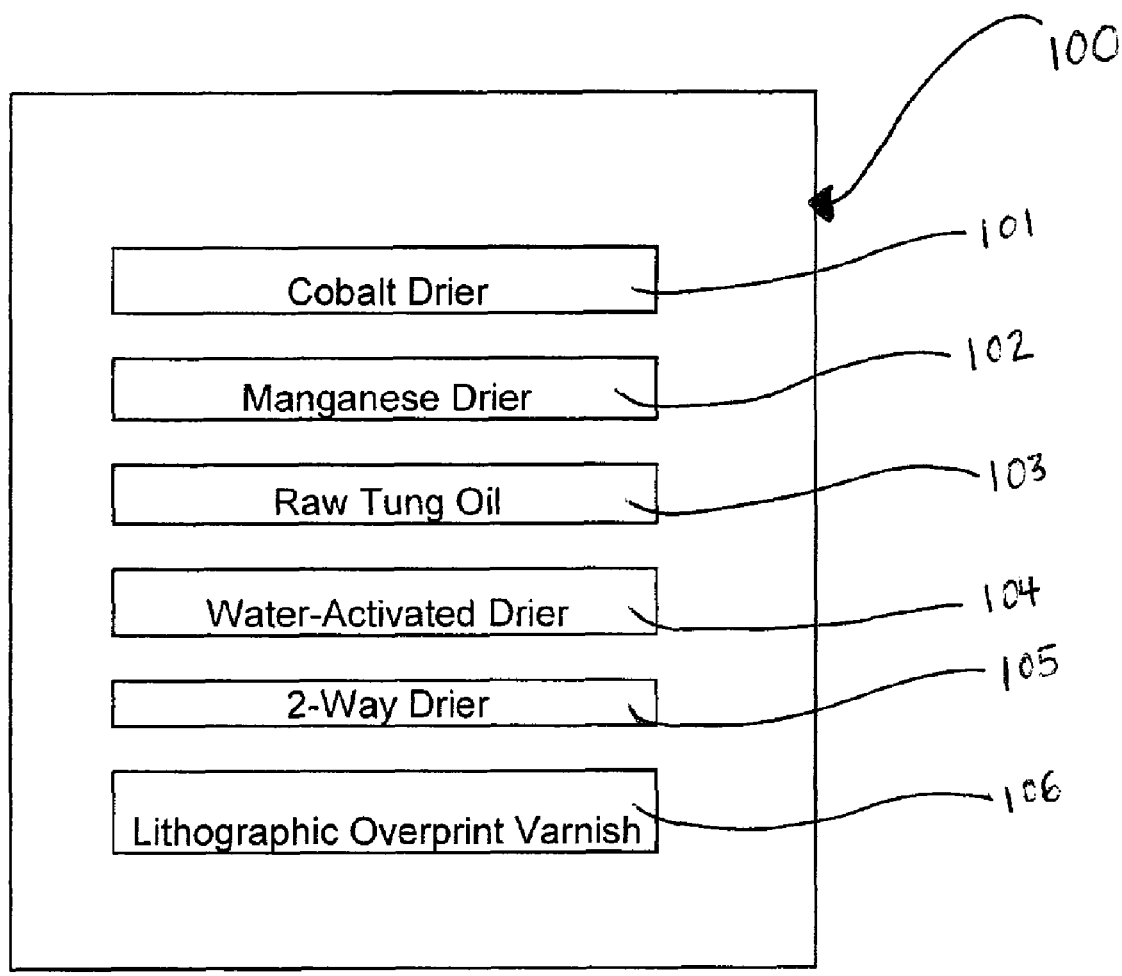
FIG. 1 shows a list of ingredients that may be combined to form an ink drying agent according to a preferred embodiment of the invention.

An ink drying agent according to a preferred embodiment of the invention is shown generally in FIG. 1 at reference numeral 100. FIG. 1 shows the ingredients that are combined to form the ink drying agent 100. One component is cobalt drier 101, a paste comprising chelated cobalt in an oil solvent. The cobalt drier 101 is present in the ink drying agent 100 at a ratio of 1 part by weight. The cobalt chelates used in cobalt driers may include carboxylates chelated to oxidized cobalt. Examples of cobalt chelated by carboxylates include cobalt tallate, cobalt acetate, and cobalt decanoate. The cobalt drier 101 is a drier composition having more than 6% cobalt by weight, and less than 14% cobalt by weight. The cobalt drier 101 is preferably a 12% cobalt drier. That is, a drier composition comprised of 12% cobalt by weight. Particularly beneficial results have been obtained from the use of the 12% cobalt drier 101. Applicants have found that 12% cobalt drier 101 yields significantly superior drying properties over lower percentage cobalt driers. For example, Applicants have found that use of a 12% cobalt drier 101 results in a fifty percent reduction in drying time in comparison to when a 6% cobalt drier is used. These superior results are unexpected as those skilled in the art would expect an increase in the concentration of cobalt to retard the drying properties and increase drying time. In addition, Applicants have found that increasing the cobalt concentration to 14% or more is not desirable as it results in the ink drier composition 100 becoming highly substrate specific.

Manganese drier 102 is added to the mixture at a ratio of 1 part by weight. Manganese drier 102 is preferably a paste comprising one or more manganese chelates in hydrocarbon-based solvent. Like cobalt, chelating agents used with manganese may include carboxylates that form compounds such as manganese tallate. A 6% manganese drier is available from Ink Systems, Incorporated of Bell, Calif. and Portland, Oreg. as "S/F Manganese Drier."

Tung oil 103 is added to the mixture at a ratio of 1 part by weight. Chinawood oil and wood oil are commonly used synonyms for tung oil and particularly raw tung oil, which may be extracted from the seeds of a Tung tree. Tung oil is typically comprised of approximately 80% ester of eleostearic acid with the remaining 20% substantially comprising esters of linolenic, 9.12-linolenic, oleic, stearic, and palmitic acids. One source for raw tung oil is Gans Ink & Supply Company Incorporated of Los Angeles, Calif. Under certain circumstance, the carboxylic acids that make up tung oil may be transformed to the corresponding carboxylates.

Synthetic stock materials generally lack the ability to absorb ink. The tung oil 103 stiffens the surface tension and increases the rubber resistance of the ink when the ink dries so that the ink maintains its appearance on synthetic stock.

Water-activated drier 103 is added at a ratio of 1 part by weight. The term "water-activated drier" is a term of art used to describe a drier comprising at least one severely hydro treated hydrocarbon. Water-activated driers are generally comprised of hydrocarbons treated with hydrogen under elevated pressures. Such treatments of hydrocarbons are used primarily to purify the system, removing metal and other impurities, and to increase the degree of saturation of the carbon chains. A preferred source of water-activated drier is Graftec manufactured by Gans Ink and Supply Company, Incorporated of Los Angeles, Calif. Graftec is comprised of petroleum hydrocarbon (severely hydro treated) CAS#647-46-7 at a maximum concentration of 11%.

Two-way drier 105 is added at a ratio of 1 part by weight. The term "two-way drier" refers generally to an ink drier containing both cobalt and manganese. A preferred source of two-way drier is Top & Bottom Drier manufactured by Braden Sutphin Ink Company of Cleveland, Ohio. Braden Sutphin Top & Bottom Drier is comprised of cobalt tallate CAS#617-52-4, manganese tallate CAS#8030-70-4, and cobalt acetate CAS#71-48-7 dissolved in technical while oil CAS#8042-47-5 to form a viscous purple liquid.

Lithographic overprint varnish 106 is added at a ratio of 1 part by weight. While available from many sources, a preferred source of lithographic overprint varnish 106 is Gans Ink & Supply Company, Inc. of Los Angeles, Calif. and is sold under the trade names "MARLITE", "AMERIGLOSS", "SOYLITE", "DIAMOND SHEEN" and "PEARLESCENT." These products comprise petroleum hydrotreated (severely hydrotreated) CAS#647-46-7 at a percentage range of 18% to 22% maximum. The preferred lithographic overprint varnish 106 is MARLITE.

To manufacture the ink drying agent 100, all of the above components are combined in the ratios described above and blended until uniform. The ink drying agent 100 has been found to be most effective when formulated such that the concentrations of each component varies by no more than +/−15%, and preferably by no more than +/−5% from the nominal ratios described above. The effect of ratio variations of the water-activated drier 103 has been found to be particularly significant and the ratio tolerance of raw tung oil 103 should preferably be held to +/−5% or less.

The combination of ingredients shown in FIG. 1 at the ratios described above results in provides the ink drying agent 100, which can be mixed with ink at a ratio of one to one by weight. The active ingredients of the ink drying agent 100 include oxidized cobalt, oxidized manganese, short chain length carboxylates, medium chain length esters, and long chain length hydrocarbons. Oxidized cobalt chelated with carboxylates (such carboxylates acting as relatively short chain length ligands) is provided by cobalt drier 101 and two-way drier 105. Oxidized manganese chelated with carboxylates (such carboxylates acting as short chain length ligands) is provided by manganese drier 102 and two-way drier 105. Medium chain length esters (substantially comprised of C-18 at various degrees of saturation) are provided by tung oil 103. These medium chain length esters may hydrolyze to corresponding carboxylic acids and/or carboxylates under aqueous conditions. The resultant medium chain length carboxylates may subsequently act as ligands to oxidized transition metals such as oxidized cobalt and oxidized manganese. Long chain length hydrocarbons (comprised of approximately C-40) are provided by water-activated drier and overprint varnish.

Components capable of acting as chelating agents or ligands comprise a carbon chain containing a carbon atom bonded to one or more oxygen atoms, in which the one or more oxygen atoms are capable of bonding to a metal, i.e. have an unbound electron pair. In the present system, these may comprise carboxylates and carboxylic acids. Carboxylic acids may be transformed to their corresponding carboxylates through de-protonation. Therefore, in many systems the two types of groups may be considered interchangeable although, strictly speaking, it is only the carboxylates that substantially bond to oxidized metals. Collectively, the carboxylates and carboxylic acids may be referred to as fatty acids.

Figure 2:
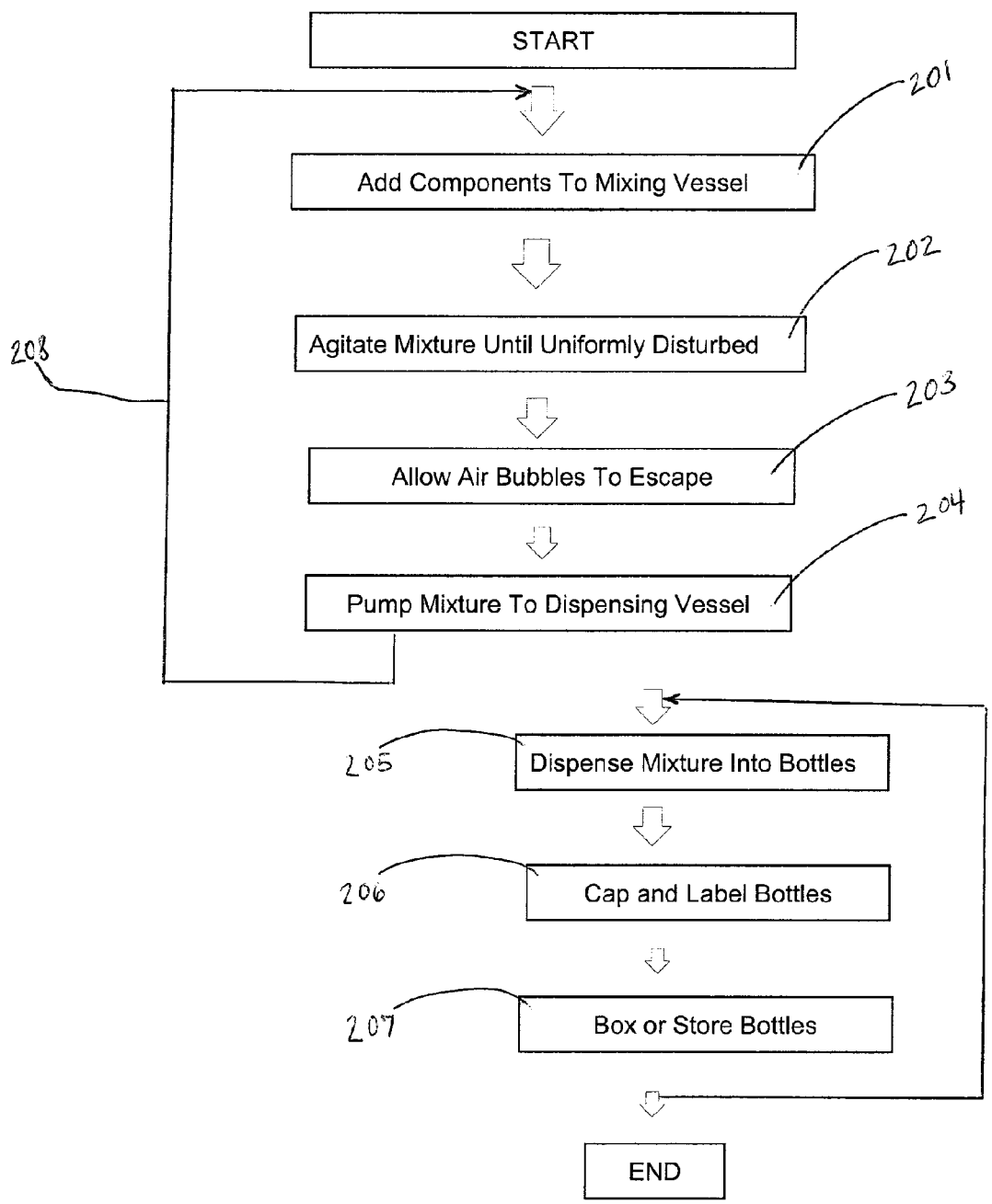
FIG. 2 is a flow chart illustrating a method for manufacturing an ink drying agent according to a preferred embodiment of the invention.

FIG. 2 is a flow chart illustrating the process of manufacturing the ink drier 100. Components of the ink drier 100 are sequentially added to a batch-mixing vessel as shown in step 201 while agitating until uniformly distributed as per step 202. A particular order for adding the components has been found to lead to efficient mixing and minimize air entrainment and other undesirable effects. The preferred order of adding the components to the batch-mixing vessel is: 1) manganese drier 102; 2) overprint varnish 106; 3) cobalt drier 101; 4) 2-way drier 105; and 5) water-activated drier 104. In small-scale manufacturing, agitation may be carried out, for instance, with a paint-mixing blade on a handheld electric drill. Under such circumstances, the amount of mixing time should preferably be about fifteen minutes. After mixing for approximately fifteen minutes, the tung oil 103 is blended in to the final mixture.

During the mixing step 202, a certain amount of air is likely entrained in the mixture. Bottling the ink drier 100 with such air bubbles still entrained tends to decrease product shelf life. Thus, step 203 may be added to allow air bubbles to escape. Step 203 is accomplished by simply allowing the mixing vessel to sit undisturbed for a period of time. It has been found that a quiescent period of approximately fifteen minutes is adequate to substantially de-aerate the mixture 100 and achieve significantly improved shelf life.

Mixing operations 201-204 are known collectively as drier blending process 208, as shown in FIG. 2. After mixing step 202, or optional de-aeration step 203, the ink drier 100 is ready to be put into bottles for shipment and storage. In order to increase production capacity, it may be desirable to empty the mixing vessel faster than could be accomplished by dispensing directly from it. In this case, the liquid mixture 100 in the dispensing vessel may be transferred to one or more dispensing vessels (step 204). After emptying the mixing vessel, the mixing process is ready to be repeated, starting with component addition step 201. For small volume manufacture, transfer step 204 may be accomplished by simply pouring the ink drier 100 into the dispensing vessel. For larger volume manufacture, it is frequently useful to pump the ink drier 100 from the mixing vessel to the dispensing vessel. Because of the high viscosity of the mixture 100 and the tendency for the mixture 100 to dry irreversibly, it is convenient to use a peristaltic pump using hydrocarbon-resistant tubing.

Dispensing 205 may similarly be carried out using one or more peristaltic pumps to transfer the viscous liquid from the dispensing vessel to plastic squeeze bottles. To maintain accurate fluid volumes and mixture throughput, a peristaltic pump controlled by a foot switch-initiated constant volume-dispensing controller may be used.

By de-coupling mixing and filling operations, the two operations may operate in parallel and, to some extent, independently. Thus, if a mishap at one step in the production cycle interrupts operations in one cycle, the other cycle may continue unimpaired, at least until available vessels are all emptied (in the case of an interruption in mixing) or all filled (in the case of an interruption while filling).

Figure 3:
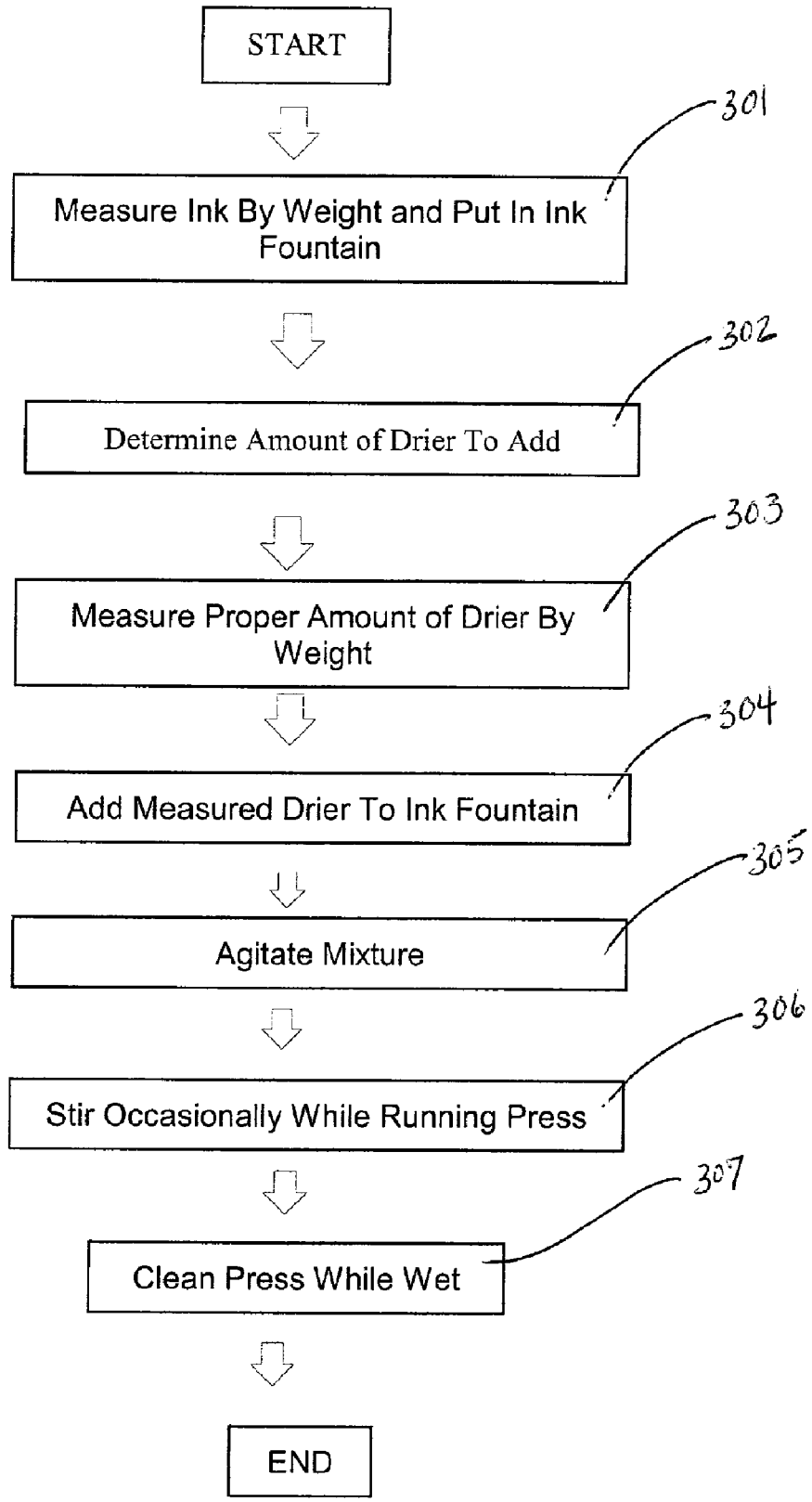
FIG. 3 is a flow chart illustrating a method of using an ink drying agent according to a preferred embodiment of the invention.
Figure 4:
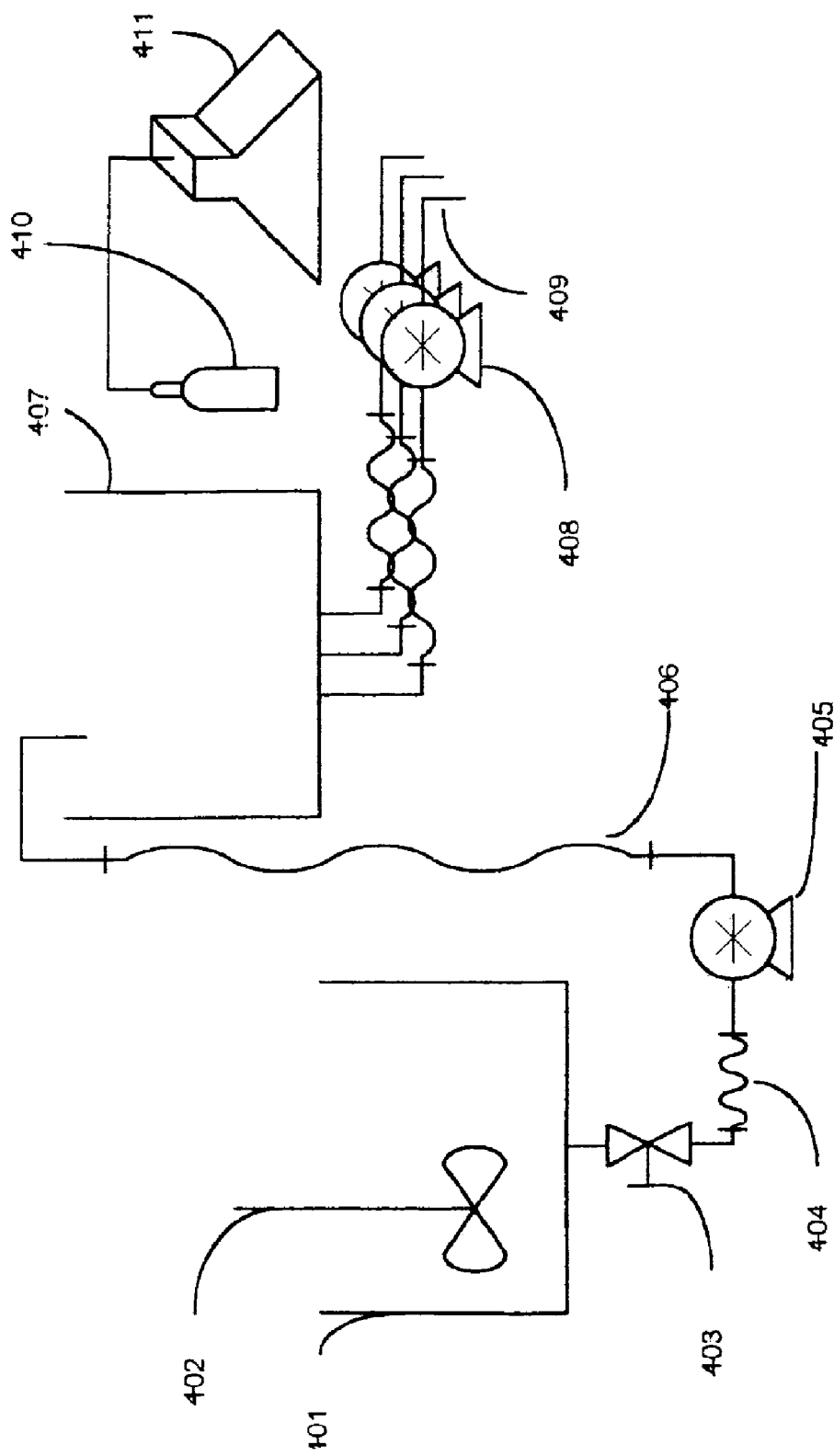
FIG. 4 is a schematic view of equipment that may be used to manufacture an ink drying agent according to a preferred embodiment of the invention.

FIG. 3 is a flow chart illustrating a preferred method for using the ink drier 100. One particular novelty of the ink drier 100 is its ability to be used at concentrations that far exceed achievable concentrations of previous ink driers. Wherein previous ink driers actually retard drying at concentrations above 3% by weight, the ink drier of the present invention may be safely used at concentration of 45% or higher by weight in an ink mixture. This is one advantage of the ink drier 100 over prior art formulations.

As shown in FIG. 3, an amount of ink to be used during a printing press run is weighed in step 301. Alternatively, the experienced pressman may be able to accurately estimate the weight of ink from its appearance in the ink fountain or on the mixing slab. Methods for determining the amount of ink to use for a given print job are known in the art.

The amount of ink drier 100 to be added is determined in step 302 based on a number of factors. Such factors include printing stock type, ink type, ambient temperature, ambient humidity, the need for quick drying of the present job, and the drying characteristics of the printing press or duplicator on which the job will be run.

For cases where faster-than-normal job turnaround is desired or where there is significant departure from the norm in the above factors, 10% to 15% of the drier 100 as a weight percentage has been found to be especially effective.

Certain particularly difficult circumstances are sometimes encountered by the printer, such as low temperature, high humidity, the use of extremely acidic or no-absorbent printing stocks (such as plastics), the use of particularly "slow inks", and/or the need for extremely fast job turnaround. In these situations, a mixture of ink and drier 100 in which the concentration of the drier 100 is up to 45% by weight has been found to be effective. For very fast printers or duplicators, that tend to expose the ink train to turbulent airflow around the rollers, it has been found that concentrations about half those described above may be more appropriate.

After the proper amount of drier 100 has been determined, the quantity of drier 100 to be combined with the ink may be weighed as indicated by step 303. Alternatively, experienced press operators may accurately estimate the quantity of drier 100 by sight.

In step 304, the drier 100 dispensed in step 303 is added to the ink dispensed in step 301. This may be done by adding the drier 100 directly to the ink fountain. Alternatively, the drier 100 and ink may be mixed on a slab prior to adding to the ink fountain. As another alternative, steps 303 and 304 may be combined, either by directly dispensing the drier 100 from its squeeze bottle onto the ink and estimating by sight, or by dispensing directly and weighing the drier container before and after dispensing.

The mixture of ink and drier 100 is thoroughly mixed in step 305. This proceeds until no areas of non-uniformity are discernable in the mixture. Most often for sheet-fed presses, this mixing is accomplished directly in the ink fountain by running an ink knife back and forth through the mixture until uniform. Following step 305, the press may be started and run normally or, for alternative applications, printing steps may proceed normally.

During the print job, or across multiple print jobs if the same batch of ink is to be used for several jobs, the ink and drier 100 mixture in the fountain should be stirred to prevent skin-over of the mixture in the fountain. This is indicated by step 306.

After the print job is finished, it is especially important to clean the press thoroughly before the ink and drier 100 mixture has a chance to dry as indicated by step 307. Frequently, this is accomplished using blanket wash, a solvent commonly used by pressmen, carried in a rag and held in contact with the rollers while the press is run empty.

In addition to use in offset lithographic printing, the ink drier 100 of the present invention may be used in the speed drying of other printing processes such as flexographic printing and screen-printing. The method of use illustrated by FIG. 3 and the accompanying description is applicable to alternative printing technologies as well.

In addition to use in on-press printing, the ink drier 100 of the present invention may be added directly to ink by the ink manufacturer or distributor, and used as-is by the end user. The preparation of such a fast-drying or hard-drying ink mixture is illustrated in FIG. 5.

Figure 5:
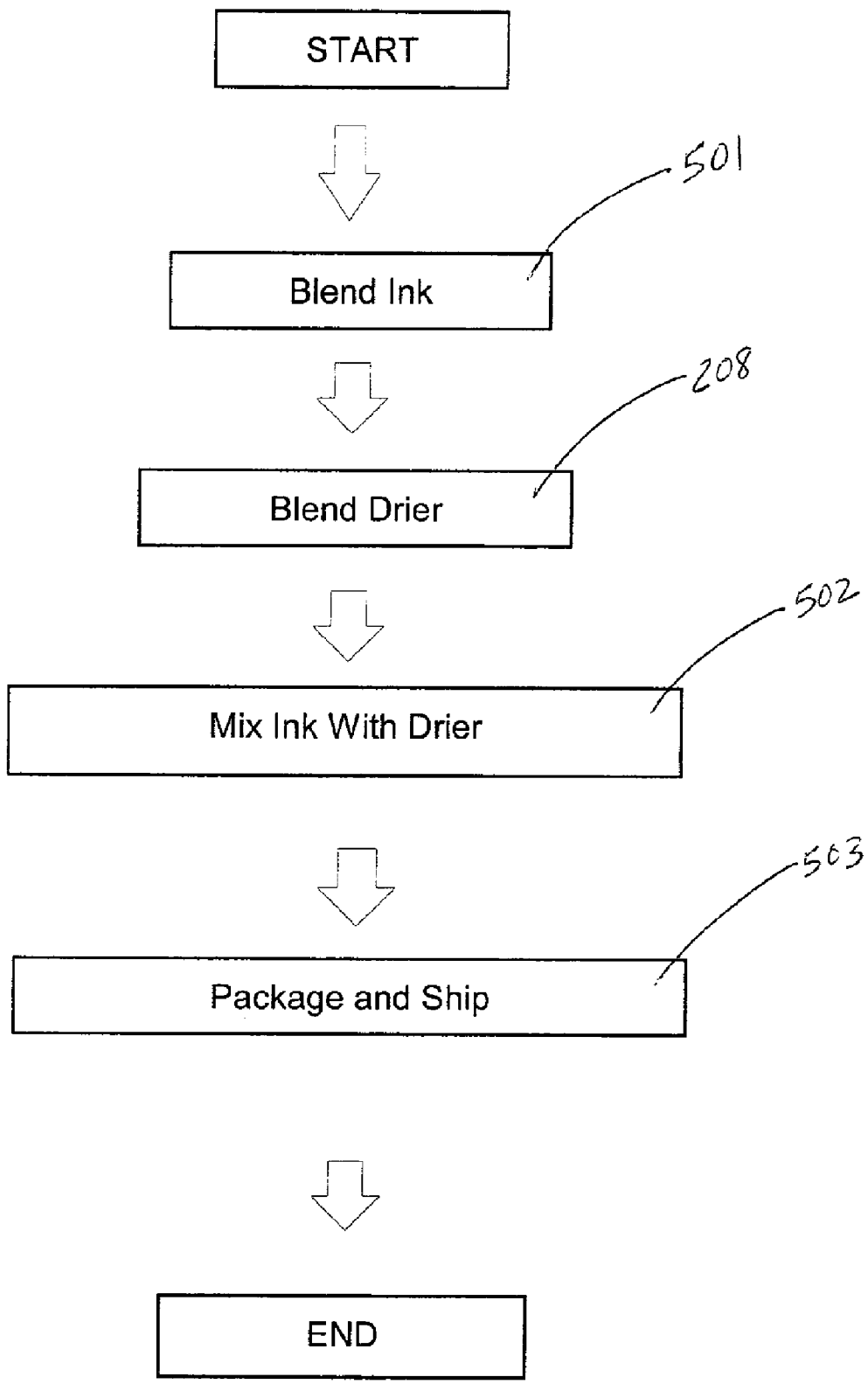
FIG. 5 is a flow chart illustrating another method for manufacturing an ink drying agent according to a preferred embodiment of the invention.

The process illustrated in FIG. 5 may additionally be used to prepare ink for printing processes other than offset lithography, including flexographic printing and screen-printing. In step 501, ink is prepared using means known in the art. Serially or in parallel, the ink drier 100 is blended per blending process 208.

Following preparation of the ink and drier 100, the two main components are combined and thoroughly mixed as indicated by step 502 according to methods known to those having ordinary skill in the art.

Alternatively, processes 501 and 208 may be combined according to methods readily apparent to those skilled in the art. If ink and drier 100 components are added and mixed in a single step, then mixing step 502 may be eliminated. Following blending of the finished product, the product may be packaged and shipped per normal handling procedures as indicated in step 503.

In addition to use as a printing ink drier, the drier 100 of the present invention may be used for speed drying in several other applications. The drier 100 is useful for speeding the drying of artists' inks such as those used for block printing and other artistic processes. Use of the drier 100 for these processes is illustrated in FIG. 3 by replacing "ink fountain" with "mixing slab" or other suitable surface, and the print job comprises carrying out the artistic printing process. Cleanup comprises cleaning the woodcut blocks and other implements used by the artist.

The drier of the present invention may be used to aid drying of oil-based paint. FIG. 6 shows a procedure for using the drier of the present invention to speed the drying of paint. As shown by step 601, an amount of paint to be used immediately is dispensed into a working container.

The amount of drier to be used may be determined, as indicated by step 602, by the end user, or alternatively may be determined prior to the user by the manufacturer of the drier 100. A weight percentage of 15% is appropriate for a wide range of uses. For use at this recommended rate, the drier package may be marked volumetrically with indices corresponding to the amount of paint used.

The painter dispenses an appropriate amount of drier 100 into the dispensed paint as per step 603 and mixes. Mixing continues until no discernable streaks are present in the paint.

The mixture of paint and drier 100 is then applied normally as indicated by step 604. To avoid waste of paint, it may be appropriate to prepare only an amount of paint/drier mixture that is to be used during the present painting session.

Paint may be pre-mixed with drier 100 by the paint manufacturer, distributor or retailer provided that care is taken to keep the paint/drier mixture in a sealed container prior to use. In this case, fast-drying paint may be prepared by a method corresponding to the method illustrated in FIG. 5 for fast-drying inks.

A drying enhancement additive and methods for making and using same are described above. Various details of the invention may be changed without departing from its scope. Furthermore, the foregoing description of the preferred embodiment of the invention and the best mode for practicing the invention is exemplary in nature and provided for the purpose of illustration only, and not for the purpose of defining the outer limits of the invention—the invention being defined by the claims.

What is claimed is:

1. An ink mixture comprising:
   (a) an ink; and
   (b) a drying agent comprising about sixteen to seventeen percent by weight of a cobalt drier, the cobalt drier comprising at least about twelve percent cobalt by weight and no more than about fourteen percent cobalt by weight.

2. An ink mixture according to claim 1, wherein the drying agent is ten to fifteen percent by weight of the mixture.

3. A paint mixture comprising:
   (a) a paint; and
   (b) a drying agent comprising a cobalt drier comprising at least about twelve percent cobalt by weight and no more than about fourteen percent cobalt by weight, a manganese drier, tung oil, a water-activated drier, a two-way drier, and a lithographic overprint varnish.

4. A paint mixture according to claim 3, wherein the drying agent is about fifteen percent by weight of the mixture.

5. An ink mixture according to claim 3, wherein the drying agent comprises about sixteen to seventeen percent by weight of the cobalt drier.

6. An ink mixture according to claim 1, wherein the cobalt drier comprises about twelve percent cobalt by weight.

7. An ink mixture according to claim 1, wherein the drying agent further comprises a water-activated drier comprising petroleum at a concentration of no more than eleven percent by weight.

8. An ink mixture according to claim 1, wherein the drying agent further comprises a two-way drier.

9. An ink mixture according to claim 8, wherein the two-way drier comprises cobalt tallate, manganese tallate and cobalt acetate.

10. An ink mixture according to claim 1, wherein the drying agent further comprises a lithographic overprint varnish.

11. An ink mixture according to claim 10, wherein the lithographic overprint varnish comprises petroleum at a concentration of no more than twenty-two percent by weight.

12. An ink mixture according to claim 1, wherein the drying agent is about three to fifty percent by weight of the mixture.

13. An ink mixture according to claim 1, wherein the drying agent further comprises a manganese drier, tung oil, a water-activated drier, a two-way drier, and a lithographic overprint varnish.

14. An ink mixture according to claim 1, wherein the drying agent comprises:
  (a) one part by weight of the cobalt drier;
  (b) one part by weight of a manganese drier;
  (c) one part by weight of tung oil;
  (d) one part by weight of a water-activated drier;
  (e) one part by weight of a two-way drier; and
  (f) one part by weight of a lithographic overprint varnish.

* * * * *